INVENTORS
Linwood W. Zoller, Jr. and
Robert Wesley Dean

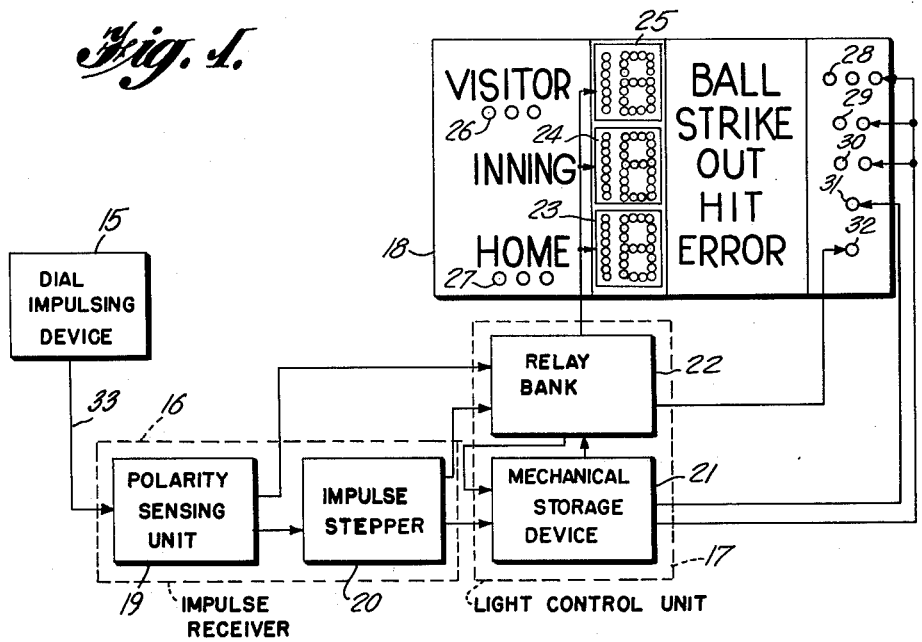

BY Mason, Fenwick & Lawrence
ATTORNEYS

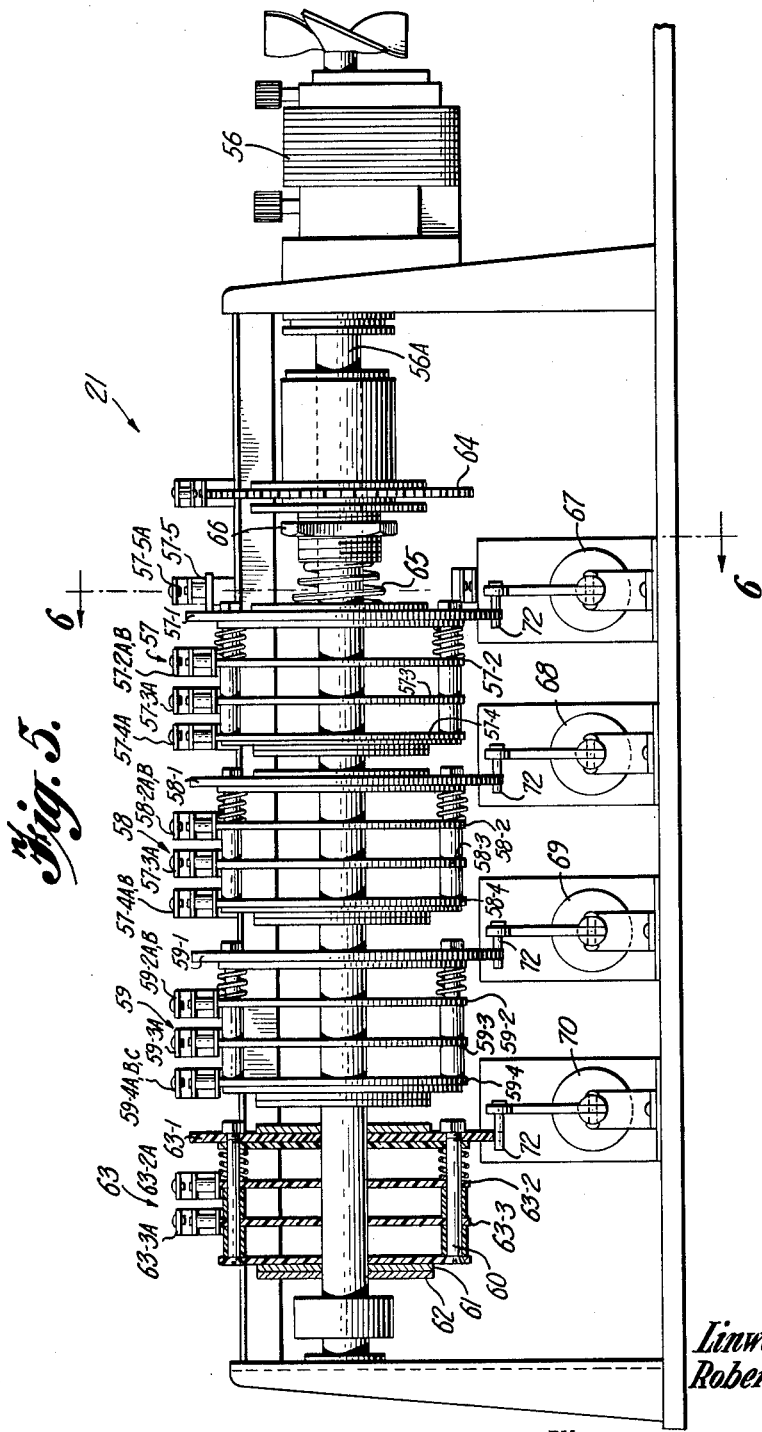

July 7, 1964                L. W. ZOLLER, JR., ET AL         3,140,476
            REMOTE CONTROL DISPLAY APPARATUS HAVING OPPOSITE
                 POLARITY PULSE CONTROL OF INFORMATION GROUPS
Filed Oct. 12, 1960                                    6 Sheets-Sheet 4

INVENTORS
Linwood W. Zoller, Jr. and
Robert Wesley Dean

BY Mason, Fenwick & Lawrence
ATTORNEYS

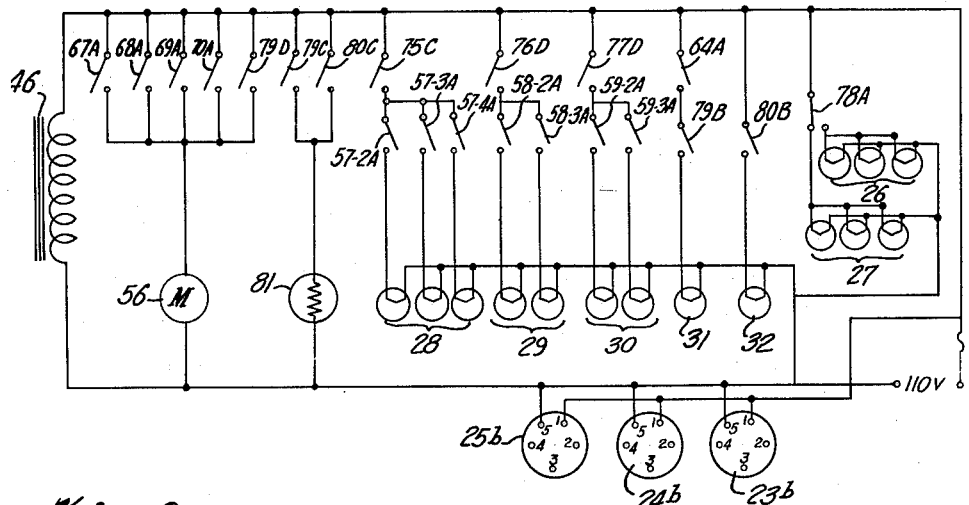
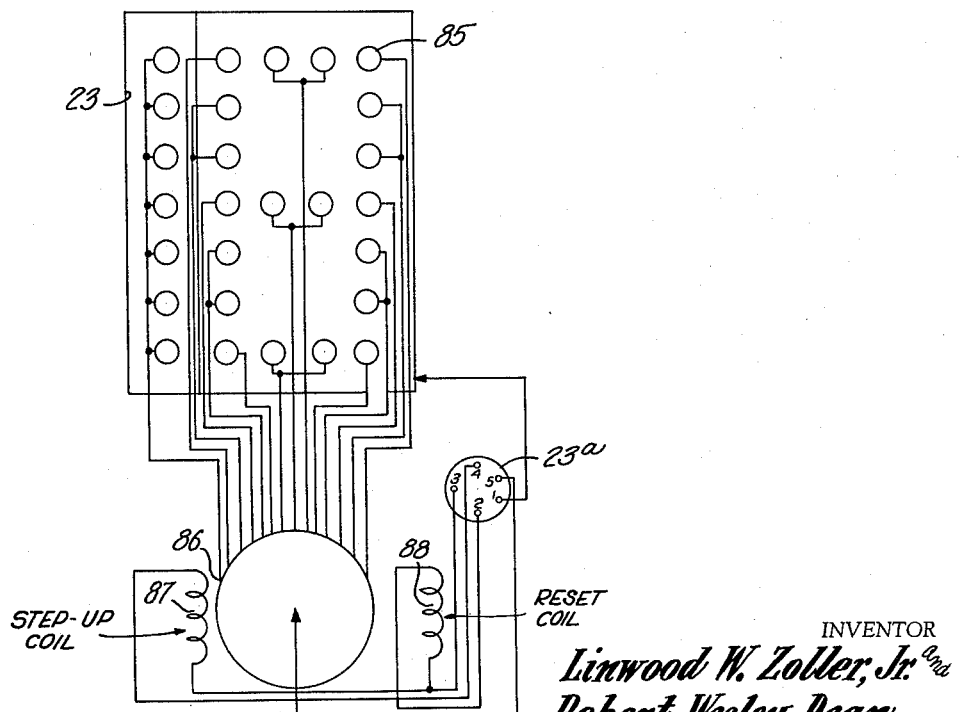

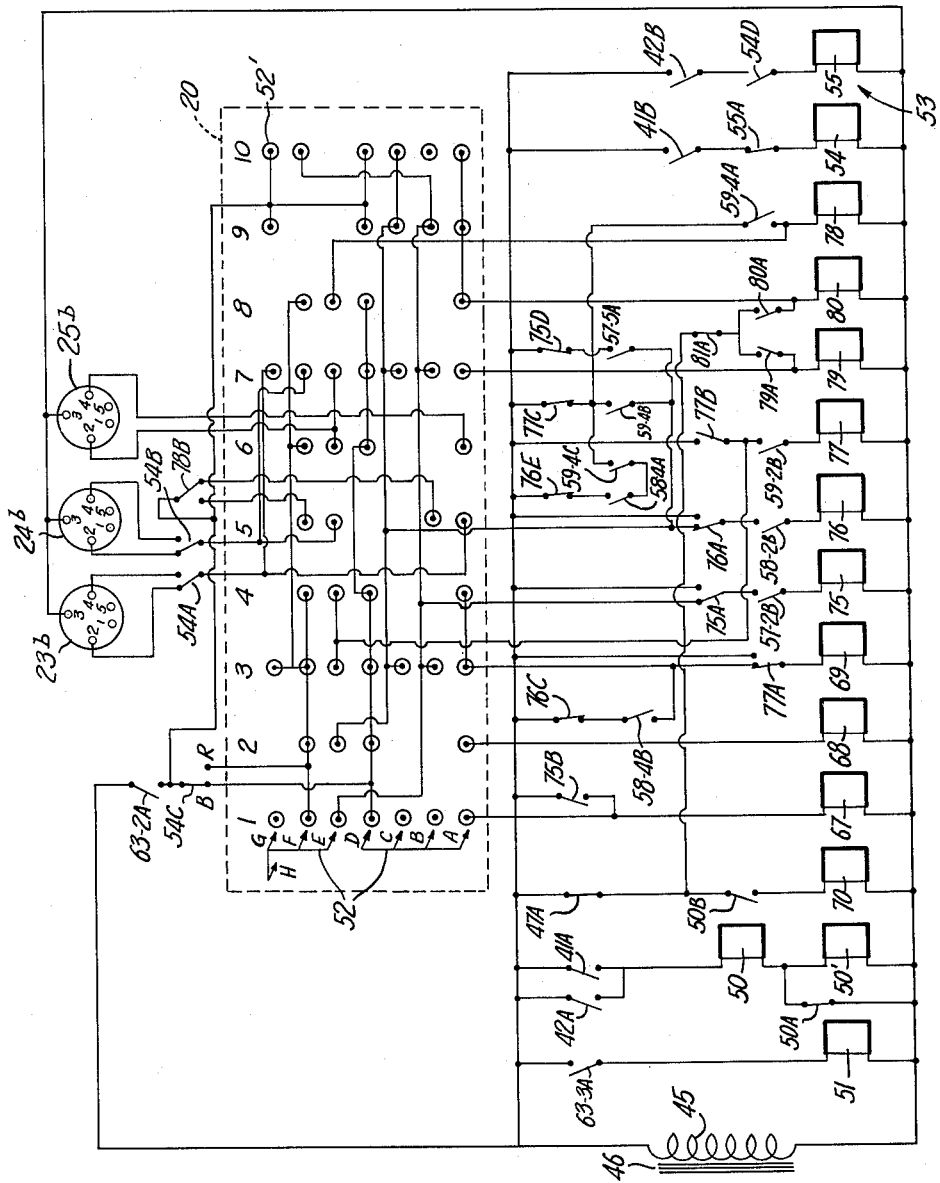

United States Patent Office 3,140,476
Patented July 7, 1964

3,140,476
REMOTE CONTROL DISPLAY APPARATUS HAVING OPPOSITE POLARITY PULSE CONTROL OF INFORMATION GROUPS
Linwood W. Zoller, Jr., 130 Parkwood Drive, and Robert Wesley Dean, Rte. 7, Skipperton Road, both of Macon, Ga.
Filed Oct. 12, 1960, Ser. No. 62,239
7 Claims. (Cl. 340—323)

The present invention relates in general to electric display systems, and more particularly to remote controlled electric scoreboard systems for recording and displaying the progress of competitive sports such as baseball and like games.

Many types of electrically controlled display boards or scoreboards have been devised for displaying the progress of competitive games such as baseball, basketball, football, hockey and the like. In most display systems of this character, it is desirable to control the displays from a position quite remote from the display board. Remote control of such a system is a costly matter, so that it is imperative that the means for connecting the transmitting mechanism with the scoreboard be simplified as much as possible.

An object of the present invention is the provision of a novel electric display system for displaying on a scoreboard an account of the progress of play of the offensive and defensive teams involved in a competitive sport and the scores amassed by these teams, wherein control of the scoreboard is achieved from a remote location interconnected with the scoreboard by a two-wire line.

Another object of the present invention is the provision of a novel remote control electrical scoreboard system for displaying the progress of a competitive game such as baseball or the like, wherein control of the scoreboard display is achieved from a remote location by activation of an automatic telephone dial transmitting impulses over one pair of wires to the scoreboard.

Another object of the present invention is the provision of a novel remote controlled electrical scoreboard system for displaying the progress of a competitive game such as baseball or the like, wherein a mechanical memory storage unit is provided for recording progress of play for selected periods and simplifying the types of controlled impulses required to achieve display of the desired information.

Other objects, advantages and capabilities of the present invention will become apparent from the following detailed description, taken in conjunction with the accompanying drawings illustrating one preferred embodiment of the present invention.

In the drawings:

FIGURE 1 is a block diagram of an electric display system embodying the present invention;

FIGURE 2 is a schematic diagram of the dial impulsing device and the polarity sensing circuit and stepper reset delay relay activated thereby;

FIGURE 5 is a side elevation of the mechanical storage device, with one of the sets of cams and the associated index disks shown in vertical longitudinal section and the index coils shown diagrammatically;

FIGURE 7 is a schematic diagram of the 110 volt circuits of the system;

FIGURE 8 is a schematic diagram of the relay bank and impulse stepper interconnected therewith;

FIGURE 9 is a schematic diagram of one of the light boxes for the scoreboard.

Figure 4:
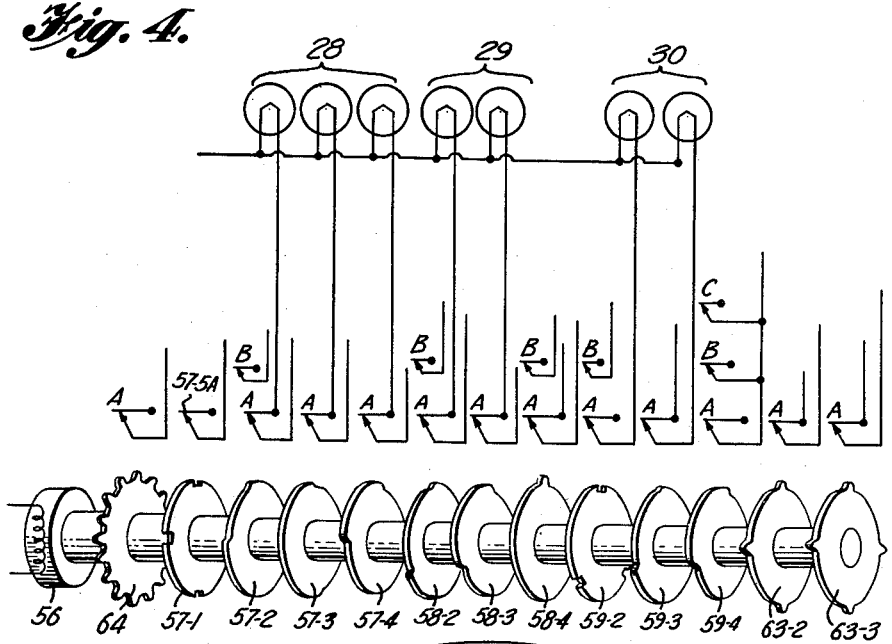
FIGURE 4 is a schematic diagram of the mechanical storage device and the scoreboard lights activated thereby.

While the electric display system of the present invention may be arranged for displaying the progress of many different types of competitive games, the specific example hereafter described will be applied to recording the progress of the game of baseball, this exemplary form being chosen because of the immense difficulty and expense normally involved in recording the play-by-play accounts of the respective baseball teams utilizing display systems of the type heretofore available.

Referring to the drawings wherein like reference characters designate corresponding parts throughout the several figures, and more particularly to FIGURE 1, the basic components of the electric display system of the present invention includes a dial impulsing device 15, an impulse receiver 16, a light control unit 17, and a scoreboard 18. The impulse receiver 16 includes, as broad functional groups therein, a polarity sensing unit 19 and an impulse stepper 20, and the light control unit 17 includes generally a mechanical storage device 21 and a relay bank 22. It will be understood, however, that the relay bank will not necessarily occur as a separate subassembly, but the relays may be physically associated with various other components of the means responsive to the control impulses produced by the dial impulsing device, the relays being here grouped as a subassembly for ease of understanding. The scoreboard 18 may be arranged as illustrated in FIGURE 1 to provide three light boxes or panels 23, 24 and 25 having for example a boxed figure 8 pattern of lights at the units digit position from which the numerals 0 to 9 may be formed by selected illumination or the like and a vertical column of lights at the tens digit position selectively indicates the numeral 1. These light boxes 23, 24 and 25 are provided to indicate the home team score, the inning, and the visitor's score respectively. The light boxes are each controlled by a rotary multiple switch having stepper and reset coils to illuminate the lamps in various patterns depicting numerals in a manner which will be well understood by those skilled in the art. The scoreboard may also include a series of lights 26 and 27 under the home and visitor's symbols respectively to indicate which team is at bat, and groups of lights 28, 29, 30, 31 and 32 to indicate respectively balls, strikes, outs, hits and errors. It will be appreciated that the dial impulsing device 15 may be located at a convenient remote station, such as in the press box or other suitable observation point in the grandstand area of a baseball field or the like and the impulse receiver 16 and light control unit 17 inclosed in a single control box housing located adjacent the scoreboard 18, the polarity sensing unit 19 of the impulse receiver 16 being connected to the impulse device 15 merely by a two-wire lead 33.

A schematic diagram of one form which may be taken by the dial impulsing device 15 and the polarity sensing unit 19 responsive to impulses produced by the impulsing device 15 is shown in FIGURE 2. The dial impulsing device 15 generally resembles a common type dialing assembly customarily used in telephone equipment. The normal practice of utilizing a dialing mechanism for the transmission of various information is limited to ten specific functions over a single signal line in a single dialing operation. Of course, it is understood that an unlimited number of functions can be obtained from the standard telephone dial by using a multidigit coded system or a multiwire system. In accordance wtih the present invention, however, there is incorporated in the dial impulsing device 15 a unique arrangement by which an additional ten functions may be obtained with the basic single dialing operation and a two-wire signal line. This is accomplished not by altering the specific number of pulses, but by altering the electrical characteristics of the pulses and by rectifying the A.C. component in the signal line 33 in a positive or negative manner. Specifically, the basic components of the dial impulsing device 15 include the usual dial impulser wheel 34 which activates the movable contact of an impulse producing switch 35, one of the contacts of the switch 35 being connected to one of the wires of the signal line 33 and the other contact of the switch 35 being connected through two parallel branch circuits having oppositely directed rectifying or blocking diodes 36 and 37 therein to the stationary contacts of a double-throw selector switch 38 which is hereafter termed the blue-red selector switch. The movable contact of this selector switch 38 is connected to the other wire of the signal line 33.

The signal line 33 may be connected by a suitable two-prong plug 39 to a socket 40 of the polarity sensing unit 19 in the impulse receiver 16. The polarity sensing unit 19 includes a pair of relays 41 and 42, hereinafter designated the blue dial relay and the red dial relay respectively, each having three single pole contacts designated 41A to 41C and 42A to 42C respectively. The blue and red dial relays 41 and 42 are connected in two branch circuits through oppositely directed silicon diodes 43 and 44 and through the socket 40 to one end of the secondary winding 45 of the transformer 46 whose primary 46′ is connected across a 110 volt supply, while the other ends of the blue and red dial relays 41, 42 are connected to the opposite end of the secondary winding 45. The turns ratio of the secondary winding 45 relative to the primary winding may be such as to produce approximately 60 volts across the secondary winding or 30 volts betwen the ends of the secondary winding and the center tap of the secondary winding. A stepper reset delay relay 47 being connected by parallel circuits one end also connected through oppositely directed silicon diodes 48 and 49 to the opposite ends of the secondary winding 45, the other end of the stepper reset delay relay 47 being conencted by parallel circuits through the contacts 41C and 42C of the blue and red dial relays 41, 42 to the center tap of the transformer secondary winding 45.

It will be seen that if the blue-red selector switch 38 is adjusted to the blue position, and the dial of the impulsing device 15 is activated to one of the ten dial positions, a number of impulses corresponding to the dial position will be produced by closing of the impulsing switch 35 and transmitted through the diodes 37 and 43 through the blue dial relay 41 to energize this relay and close its normally open contacts. With the blue-red selector switch 38 adjusted to the red position, the path of current flow for the impulses produced by the impulsing switch 35 will be through the diodes 36 and 44 through the red relay 42 to energize this relay only. By this arrangement, therefore, an additional ten functions are added to the standard ten-hole telephone dial system without the addition of any more signal wires.

Figure 3:
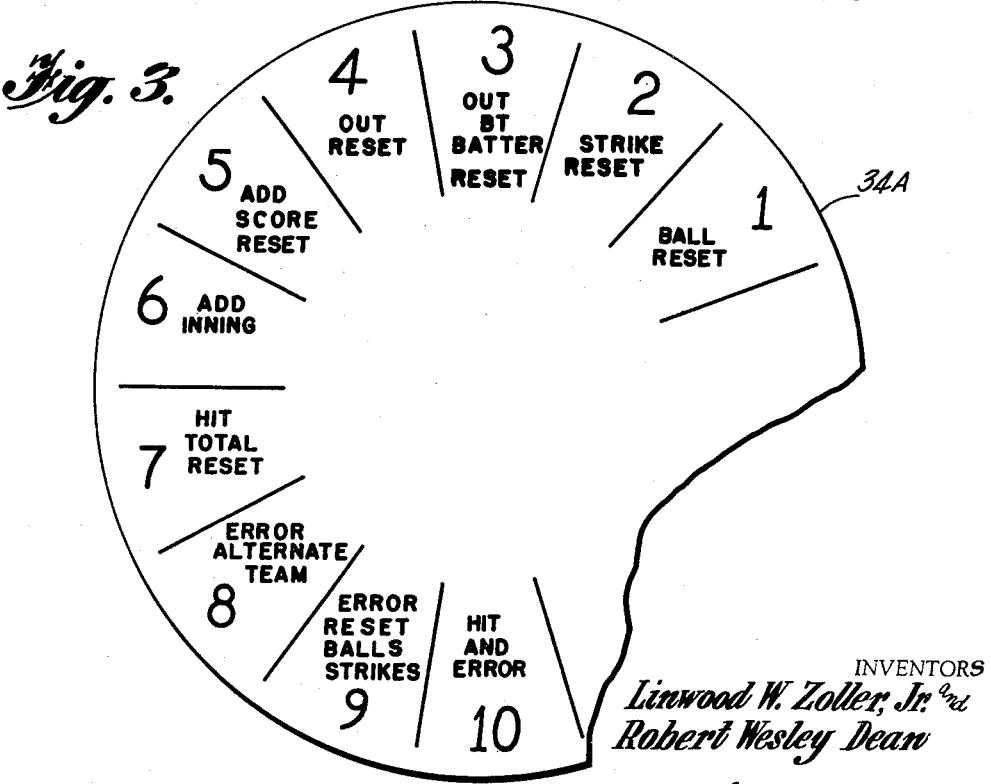
FIGURE 3 is an illustration of a dial position indicator card showing the functions which may be signaled by activation of the dial from the ten different dial positions when the display system is arranged to control a scoreboard to illustrate play for the game of baseball.
Figure 6:
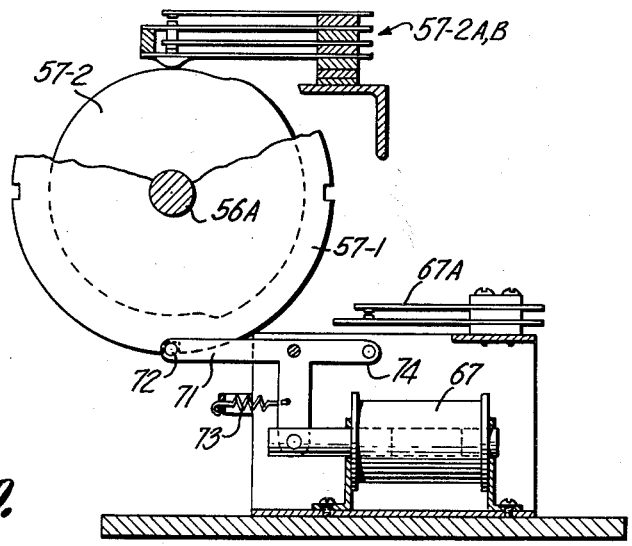
FIGURE 6 is a transverse section view taken along the line 6—6 of FIGURE 5.
Figure 10:
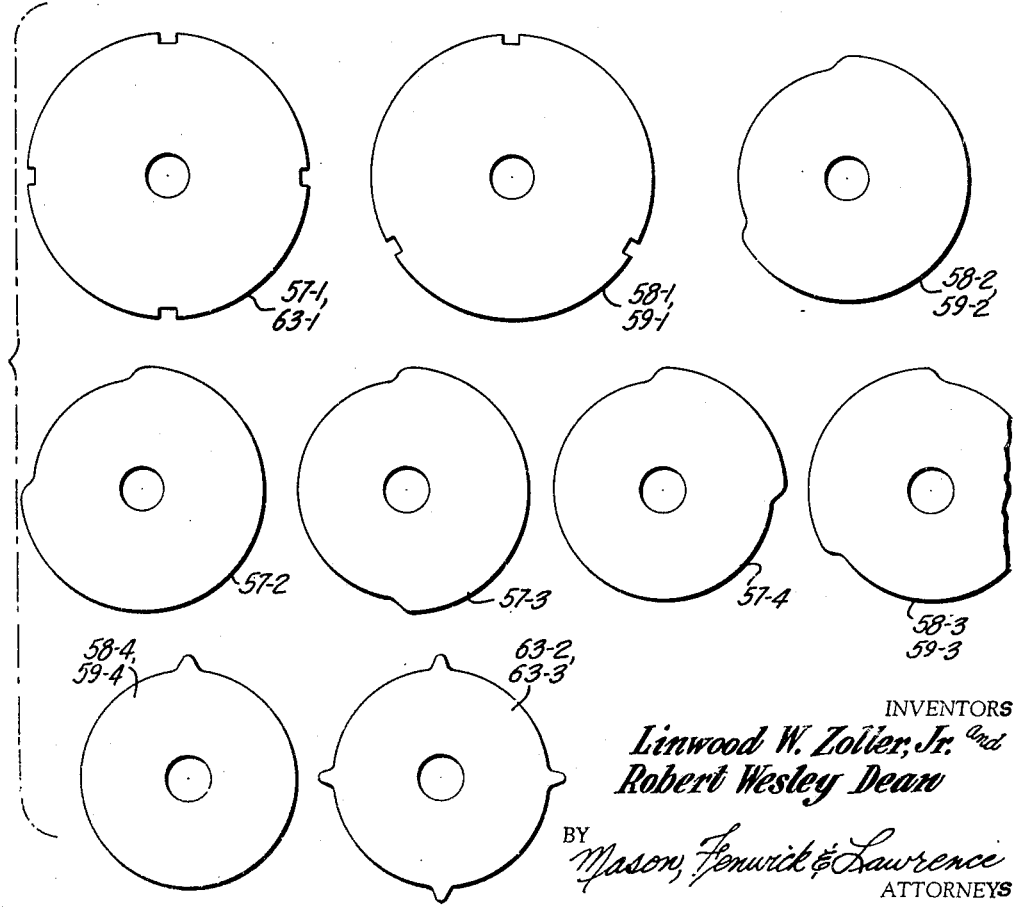
FIGURE 10 is a diagram illustrating the index disks and cams which may be used in the mechanical storage device.

Applying this concept to the baseball scoreboard display system, the basic ten functions available when the blue-red switch 38 is in the blue position are utilized to record the play-by-play account of the offensive and defensive teams. Due to the human element involved in the operation of this device, it is desirable to incorporate a means by which a mistake may be corrected with a minimum of effort and time. The additional ten functions available when the blue-red selector switch 38 is in the red position are primarily used to this end. To further simplify the operation of the device, all corrective functions have the same dialing position as their counterparts. The various functions of the dialing mechanism listed in accordance with the dial positions are tabulated as follows, the symbols blue, red and black indicating the colors in which the lettering is imprinted on the dial position indicator card 34a used with the dial, as illustrated in FIGURE 3, and the alignment of the legends in the blue and red columns indicating the functions signaled when the blue-red selector switch 38 is in the blue and red positions respectively:

| Dial Position | Blue | Red |
| --- | --- | --- |
| 1st | Ball | Reset. |
| 2nd | Strike | Do. |
| 3rd | Out by Batter | Do. |
| 4th | Out | Do. |
| 5th | Add Score | Do. |
| 6th | Add Inning | Do. |
| 7th | Hit | Total Reset Score. |
| 8th | Error | Alternate Teams. |
| | Black | |
| 9th | Error, Reset Ball and Strikes. | Error, Reset Ball and Strikes. |
| 10th | Hit and Error | Hit and Error. |

A clearer understanding of the invention will be had by describing at this point the effects to be achieved by activating the dial of the impulsing device 15 to the various positions, with the selector switch 38 in the blue and red positions respectively.

Movement of the dial to the first blue or ball position in a counterclockwise direction from its 0 position with the selector switch 38 in blue position will activate a ball indicating light 28 on the scoreboard 18. When all three of the ball lights 28 have been activated, the impulse from the fourth activation of the ball or first blue position will clear all of the activated ball lights 28 and clear strike lights 29 which might have been activated. The ball reset or first red position, with the selector switch 38 at the red position, is used in the event a mistake was made in recording the balls, and upon impulse, all activated ball lights 28 will automatically clear.

The second blue or strike position of the dial will, upon impulse, activate a strike light 29 at the scoreboard 18, and when two strike lights 29 have been activated, the impulse upon the third activation of the dial to the strike position will clear all activated strike lights 29 and clear all ball lights 28 which might have been activated, and will also activate an out light 30. If the two out lights 30 were already activated, the third strike impulse will clear all activated out lights and alternate the team indicator lights 26 and 27. The second red or strike reset dial position is used in the event a mistake was made in recording the strikes and upon impulse the strike lights will be immediately cleared.

The third blue or out-by-batter dial position activates an out light 30 at the scoreboard and clears all ball lights 28 or strike lights 29 which might have been activated. If two out lights 30 have already been activated, the third activation of the out-by-batter position will clear all activated out lights 30 and alternate the team indicator lights 26, 27. The third red or out-by-batter reset position is used in the event a mistake was made in activating the third blue position.

The fourth blue or out dial position activates an out light 30 without clearing the ball and strike lights. As in the case of the third blue dial position, if there were two out lights 30 already activated, the third activation of the fourth blue dial position will clear all activated out lights 30 and alternate the team indicator lights 26, 27. The function of the fourth red or out reset position is the same as the function of the third red position.

The fifth blue or add score dial position adds one run to the existing score of the team which is at bat on either the light box 23 or 25. The fifth red or add score reset position resets the score of the team at bat to 0 on the appropriate one of the light boxes 23, 25.

The sixth blue or add inning dial position advances by one the number displayed on the inning light box 24, and the sixth red or add inning reset position resets the inning light box 24 to 0.

The seventh blue or hit dial position impulses the hit light 31 which blinks at a predetermined rate for a selected period, for example 15 seconds, and then automatically deenergizes the hit light 31, and clears all ball and strike lights which might have been activated. The seventh red or total reset score and inning dial position resets the scores and inning numbers displayed in the light boxes 23, 24 and 25 to 0.

The eighth blue or error dial position activates the error light 32, which remains lighted for a selected period, for example 15 seconds, and is automatically disconnected. The eighth red or alternate team's position transfers activation from one to the other of the home and visitors' team indicator lights 26 and 27.

The legend adjacent the ninth and tenth dial positions is printed in black and the indicated functions are effected regardless of whether the selector switch 38 is in the blue or red position. The ninth dial position is labeled error, reset balls and strikes, and is designed to activate the error light 32 at the scoreboard, which is automatically disconnected after a selected delay interval, and clears all ball and strike lights which might have been activated.

The tenth dial position is labeled hit and error and its function is the same as the combined functions of the seventh and eighth blue dial positions.

It will be apparent that the blue and red dial relays 41 and 42 are rendered polarity sensitive by the blocking rectifiers 43 and 44 so that the pulses produced by the dial impulsing device 15 will operate only one of these relays in accordance with the position of the selector switch 38.

The other major component of the impulse receiver 16 is an impulse stepper 20 provided to determine the number of pulses received and to be activated in accordance with the number of pulses to establish the necessary circuit connections to perform the functions signaled. The impulse stepper 20 includes two basic coils, a stepper advance coil 50 and a stepper reset coil 51. These coils are shown in FIGURE 8 in conjunction with the relay contacts and cam contacts which control energization of the stepper advance coil 50 and reset coil 51. The impulse stepper is in the general physical form of a multiple switch which includes a ratchet wheel to be stepped progressively by activation of the stepper advance coil 50 and advance a series of radially extending wipers about a rotary axis. While the series of contacts are physically arranged on a disk in selected circular paths concentric with the axis of the disk to be contacted by selected ones of the wipers, the contacts are illustrated in the form of a rectangular contact board in FIGURE 8 with the contacts in horizontal alignment with the respective wipers that cooperate with them, the vertical rows of contacts being labeled 1 to 10 to indicate the sets of contacts engaged by the wiper for the various numbers of dial impulses. In FIGURE 8, the contacts are indicated by the reference character 52', and the wipers are designated by the reference character 52, eight wipers 52 being employed in this preferred embodiment, designated respectively by the postscrips A through H.

The stepper advance coil 50 is activated by closing of either of the contacts 41A or 42A of the blue and red dial relays 41 and 42 respectively, so that the wiper arms 52A to 52H are advanced successively from the number one column to the number ten column of fixed contacts 52' in accordance with the number of impulses received from the dial impulsing device 15. Only the circuits responsive to the blue-red selector switch 38 of the dial impulsing device 15 will be operated at any given stepper position. This is accomplished by the incorporation of a mechanical latch-type relay 53 having coils 54 and 55 whose specific functions are determined by activation of one of the blue or red dial relays 41, 42. The relay coil 54 is designated the blue-red alternate latch coil and the relay coil 55 serves as the release coil, the mechanical construction of the relay 53 being such that the state of the relay contacts remains in either the blue or red state until the opposite state is dialed. The coil 54 includes three sets of double-throw contacts A, B, and C used to change the functions of the impulse stepper 20 from blue to red functions as indicated on the card 34a of the impulsing device 15 and a single-throw contact D. The release coil 55 includes only a single-throw contact A. The single-throw contacts 54D and 55A are used to prevent unnecessary arcing of the operated contacts 41B and 42B of the blue and red dial relays 41, 42.

The mechanical storage device 21 of the light control unit 17 is provided to effect proper sequencing of control signals in the system and to store information as to progress of play to effect proper activation of the scoreboard lights. The mechanical storage device 21 is designed to store a number of units of information on a rotary mechanism which could return to a reset position by either continuing through its normal course of rotation or by reversing itself, although in the embodiment described herein, the units return to reset position by continuing through their normal course. The mechanical storage device is illustrated in FIGURES 4 through 8, and includes a cam motor 56 driving a horizontal cam shaft 56a journalled in suitable supports and having three memory units thereon to record balls, strikes and outs, identified respectively by the reference characters 57, 58 and 59, each of which comprises an indexing disk and three cams. In one practical embodiment, the indexing disks 57–1 may have four peripheral notches spaced 90° apart, and the disks 58–1 and 59–1 may have three equally spaced peripheral notches located 120° apart, and each of these disks are ganged with their associated cams by bolts 60 located at diametrically opposed points relative to the shaft 56a and extending from a rigid mounting plate 61. Adjacent the mounting plate 61 of each of the cam and index disk groups 57, 58 and 59 is a drive clutch unit 62 including a plate fixed to the mounting plate 61 and a separate plate keyed to the shaft 56a and engageable with its companion plate through a leather clutch ring or the like. The mechanical storage unit also includes a sequence cam unit 63 including a sequence indexing disk 63–1 and sequence cams 63–2 and 63–3 rigidly held against rotation relative to the disk 63–1 and a drive clutch 62 having a plate keyed to the shaft 56a. An impulser cam 64 is also fixed to the shaft 56a. A spring 65 bears against the balls memory unit 57 and is adjustable by means of a suitable adjusting nut 66 to regulate the pressure upon the drive clutches 62 to set up a required amount of torsional stress to rotate the units when desired, but also to permit the units to slip relative to the shaft 56a when desired.

The units 57, 58 and 59 and the sequence cam unit 63, are normally held against rotation by means of index coils, respectively designated as ball index coil 67, strike index coil 68, out index coil 69 and sequence index coil 70. These index coils are of identical construction, the relationship of the index coils to their associated index disks being revealed by FIGURE 6. The index coils 67–70 include a suitable index arm 71 secured to a fixed pivot and coupled to the plunger of the index coil, the index arm 71 having a pin 72 on the end thereof to fit into indexing notches in the index disks 57–1, 58–1, 59–1 and 63–1 to normally hold the index disks against rotation with the shaft 56a, a spring 73 normally biasing the index arm 71 to the disk-holding position. Each of the index arms 71 is also provided with an extension 74 positioned to close the adjacent one of the index switches 67A–70A, which index switches are arranged in parallel with each other and in series with the windings of the cam motor 56 across the 110 volt supply. Thus, upon energization of any of the index coils 67–70, the associated index switch 67A–70A will be closed establishing the supply circuit to the cam motor 56 and causing the cam motor 55 and the shaft 56a to rotate. This same movement of the index arm 71 coupled to the activated index coil 67–70 withdraws the pin 72 from the associated index disk and permits the index disk and its intercoupled cams to rotate.

The sequence cams 63–2 and 63–3 are provided with eight equally spaced raised teeth on the periphery thereof to momentarily close the cam contacts 63–2A and 63–3A respectively, associated with the sequence cams 63–2 and 63–3. The sequence cam contact 63–2A controls the application of current from the 50 volt transformer secondary to the impulse stepper contacts, and the sequence cam contact 63–3A is interposed in the 50 volt supply to the stepper reset coil 51 to reset the wipers of the impulse stepper a selected delay interval after activation of the stepper advance coil 50, and after application of the 50 volt supply to the impulse stepper contacts. This is achieved by relative angular phasing of the raised teeth on the cam 63–3 relative to the teeth on the cam 63–2.

The ball cams 57–2, 57–3 and 57–4, strike cams 58–2, 58–3 and 58–4, and out cams 59–2, 59–3 and 59–4 are each supplied with contacts designated by the postscript A which are closed by the raised portions of their associated cams to establish the 110 volt supply to the ball lights 28, strike lights 29 and out lights 30 on the scoreboard or serve other functions to be later described. Certain of these cams are supplied with additional sets of contacts identified by the postscrips B and C in ascending alphabetical order progressing away from the associated cams, for performing other functions which will be later described. Ball four functions are provided by a rigid pin 57–5 mounted on the ball indexing disk 57–1 and cooperating with contacts 57–5A.

The stepper advance coil 50 has associated therewith two sets of contacts 50A and 50B, the contacts 50A forming an arm switch associated with a series coil 50'. The purpose of the arm switch contacts 50A and series coil 50' is to provide protection for the intermittently rated stepper advance coil 50. In all A.C. operated coils, a greater current is needed to activate the coil than to hold it energized because of the great impedance change as the plunger enters the magnetic field further. The arm switch contacts 50A, which are normally closed, bypass the series coil 50' and allow full voltage to operate the stepper advance coil 50 when it is in rest position. As soon as the stepper advance coil 50 has pulled the plunger completely in, the arm switch contacts 50A open, thereby reducing the applied voltage to a value which will not be injurious to either coil 50 or 50'. This protects these coils if the operator were to rotate the dial and not release it.

The contacts 50B form a normally open zero switch which closes after the first impulse to the stepper advance coil 50. The stepper delay relay 47 incorporates shorting rings to delay the fall-out of its contacts 47A after deenergization. The contacts 47A are normally closed, therefore the sequence index coil 70 which is connected in series with the contacts 47A and zero switch contacts 50B can operate only after the stepper delay relay 47 returns to rest or deenergized position and the stepper ratchet wheel is off rest position, the latter condition being indicated when the zero switch contacts 50B are closed. The delay time or fall-out time of the stepper delay relay 57 is much greater than intervals between dial impulses and therefore the relay 47 will fall out only after the last pulse of a train of pulses from the impulsing device 15. This arrangement allows the sequence index coil 70 to operate only after the impulse stepper 20 has received the proper number of pulses for a specific operation.

The blue-red latch relay 53, as previously mentioned, is of the type which maintains any given state after any particular operation until a different operation is performed, and the impulse stepper 20 functions as a blue or red stepper dependent on the state of the contacts 54A, B and C of the relay 53. The latch relay 53 assumes its specific state before the stepper delay relay 47 falls out, that is on the first dialing impulse. The wiper arms 52 or contacts 52' on the impulse stepper 20 are grouped as red and blue functions as will be apparent from an inspection of the circuit diagrams illustrated in the drawings, the contacts 54A, B and C on the latch relay 53 merely acting to alternate these functions.

Cooperating with the mechanical storage device 21 and the impulse stepper 20 to effect proper switching of the electrical supply to the scoreboard lights and effect proper resetting of the apparatus and particularly components of the mechanical storage device 21 is the relay bank 22, the operation of the various relays and contacts of which, in conjunction with the remaining components of the apparatus, will be apparent from a study of the circuit diagrams illustrated in the drawings. As already alluded to, the relay bank 22, as illustrated in the ladder diagram of FIGURE 8, includes the sequence cam index coil 70, the ball index coil 67, the strike index coil 68 and the out index coil 69 which are activated through other relay contacts or through the contacts 52' and wipers 52 of the impulse stepper 20 to effect advancement of the indexing disks 63–1, 57–1, 58–1 and 59–1 respectively, to effect appropriate advancement of the ball, strike or out cams of the mechanical storage device 21 and consequent activation of their associated cam contacts to energize the appropirate scoreboard lights. The relay bank also includes a ball reset relay coil 75, a strike reset relay coil 76 and an out reset relay coil 77 interconnected in the 50 volt A.C. circuit provided by the secondary 45 with other relay contacts and with the impulse stepper 20. The ball reset relay and out reset relay 77 each have single-pole double-throw contacts A and single-pole single-throw contacts B, C and D, and the strike reset relay 76 includes similar contacts A, B, C and D and an additional set of single-pole, single-throw contacts E.

There are also incorporated in the relay bank 22 a home-visitor alternator relay coil 78 having sets of single-pole double-throw contacts A and B, a hit relay coil 79 having single-pole, single-throw contacts A, B, C and D, and an error relay coil 80 having single-pole, single-throw contacts A, B and C.

By reviewing the ladder diagram of FIGURE 8, the supply connections to the various index and reset relay coils as well as the hit and error relay coils and the home-visitor alternate relay coil will be apparent. The ball index coil 67 is connected across the 50 volt A.C. supply in the secondary 45 of the transformer 46 through the number one position contact 52' of the impulse stepper in the path of the wiper 52A and thence through the wiper 52D and the number one position contact 52' in the path thereof, then through the contacts 54C of the red-blue alternate latch relay 53 and the sequence cam contacts 63–2A. An alternate supply circuit to the ball index coil 67 is provided through the ball reset relay contacts 75B. In similar manner, the strike index coil 68 is connected with the 50 volt A.C. supply through the impulse stepper 20 and by a bypass circuit through the circuit reset relay contacts 76B. Similarly, the supply circuit for the out index coil 69 includes the contacts 77A of the out reset relay and the impulse stepper 20, and a by-pass circuit is provided through the strike three cam contacts 58–4B and the strike reset relay 76C. The out reset relay contact 77A also provides a direct connection between the out index coil 69 and the 50 volt A.C. supply through the normally open contact thereof.

The ball reset relay coil 75 is connected across the 50 volt A.C. supply through the ball one cam contacts 57–2B and the movable contact and normally closed stationary contact of the ball reset relay contacts 75A to the impulse stepper 20 and through the normally open contact of the contacts 75A directly to the transformer secondary 45. The strike reset relay coil 76 is connected through the strike one cam contacts 58–2B and the movable contact and normally closed stationary contact of the strike reset relay contacts 76A to the impulse stepper 20. The stationary normally closed contact of the strike reset relay contacts 76A are also connected through the ball four pin contacts 57–5A and the ball reset relay contacts 75D to the transformer secondary 45, and through the out three cam contacts 59–4B and the out reset relay contacts 77C to the transformer secondary 45.

The out reset relay 77 is connected through the out one cam contacts 59–2B and either the impulse stepper 20 or the out reset relay contacts 77B to the transformer secondary 45.

The hit relay coil 79 and error relay coil 80 are connected through the impulse stepper 20 to the transformer secondary 45 and also through hit relay contact 79A or error relay contacts 80A, and the contacts 81A of a thermal delay tube 81, and thence through the stepper delay relay contacts 47A to the transformer secondary 45.

The home-visitor alternate relay coil 78 is also connected through the impulse stepper 20 to the secondary 45 and through the out three cam contacts 59–4A and the out reset relay contacts 77C to the transformer secondary. This relay 78 is mechanically constructed to reverse the condition of its contacts upon any energization of its coil and maintain this contact condition until reversed by subsequent energization of its coil.

The normally closed contact of the ball reset relay contacts 75A serves, when the coil is energized, to disconnect the coil 75 from the operating circuits after the relay locks in to prevent feed back to certain circuits in the impulse stepper 20 while the stepper is resetting, and the normally open contact of the contacts 75A locks the ball reset relay 75 in until the ball cam contacts 57–2B open. The normally open contacts 75B operate the ball index coil 67 to rotate the ball cam assembly 57 to rest or "no balls" position, the normally closed contacts 75C disconnect the 110 volt feed to the ball cam contacts 57–2A, 57–3A and 57–4A to prevent progressively lighting additional ball lights while resetting existing balls, and the normally closed contacts 75D disconnect the ball four pin contacts 57–5A from the strike reset circuit to prevent existing strikes from being reset when balls are being reset.

The strike reset relay contacts 75A serve similar functions in connection with the coil 76 as those served by contacts 75A of the relay 75, while the normally open contacts 76B operate the strike index coil 68, the contacts 76C disconnect the strike cam contacts 58–4B to prevent adding an out while strikes are resetting, the contacts 76D disconnect the 110 volt feed to the strike cam contacts 58–2A and 58–3A, and the contacts 76E disconnect the strike cam contacts 58–4A to prevent resetting any existing balls while strikes are being reset.

The contacts 77A of the out reset relay 77 serve similar functions to the contacts 75A and 76A, the contacts 77B lock the out reset relay 77 until the out cam contacts 59–2B open, the contacts 77C disconnect the out cam contacts 59–4A, 59–4B and 59–4C while the outs are resetting to prevent balls and strikes from resetting and team alternating, and the contacts 77D disconnect the 110 volt feed to the out cam contacts 59–2A and 59–3A to prevent progressively lighting additional out lights while resetting existing outs.

The contacts 79A of the hit relay coil 79 lock in the hit relay until the delay tube contacts 81A open the circuit, the contacts 79B connect the hit light on the scoreboard to the pulse cam contacts 64A, the contacts 79C operate the heater of the delay tube 81, and the contacts 79D operate the cam motor 55 to operate the pulse cam contacts 64A.

The contacts 88 of the error relay coil 80 lock in the error relay until the delay tube 81 opens the circuit, the contacts 80B operate the error light on the scoreboard, and the contacts 80C operate the heater of the delay tube 81.

The contacts 54A of the red-blue alternate latch relay 53 alternate the circuit from the impulse stepper contacts 52′ at position five from the advance coil to the reset coil on the home numeral light box 23, the contacts 54B alternate the circuit from the impulse stepper contacts 52′ at position five from the advance to the reset coil on the visitor's numeral box 25, and the contacts 54C alternate the circuit from the sequence cam contacts 63–2A from the blue to the red wiper circuits. It should be noted that the blue circuits are affirmative functions such as adding a ball, adding a strike and the like, while the red circuits are corrective functions, such as clearing balls, clearing strikes and the like. Contacts 54D, which are normally open, disconnect the latch release coil 55 from the operating voltage, and the contacts 55A associated with the release coil 55 disconnect the latch coil 54 from the operating voltage.

To review in summary some of the functions on the cam contacts associated with the various cams on the shaft 56A, the impulse cam contacts 64A impulse the hit light on the scoreboard through the contacts 79B of the hit relay 79. The ball cam contacts 57–2A operate the ball one light on the scoreboard, the contacts 57–3A operate the ball two light, and the contacts 57–4A operate the ball three light. The contacts 57–2B determine the rest position for the ball resetting circuits, and the contacts 57–5A close momentarily while the ball cam assembly 57 is in transit from the ball three position to rest, to clear any existing strike when the fourth ball is dialed.

The strike cam contacts 58–2A operate the strike one light, contacts 58–3A operate the strike 2 light, contacts 58–2B determine the rest position for the strike resetting circuits, the contacts 58–4A close momentarily while the strike cam assembly 58 is in transit from the strike two position to rest to clear any existing balls when the third strike is dialed, and the contacts 58–4B add one out when the third strike is dialed.

The out cam contacts 59–2A operate the out one light, the contacts 59–3A operate the out two light, contacts 59–2B determine the rest position for the out resetting circuit, contacts 59–4A close momentarily while the out cam assembly 59 is in transit from the out two position to rest and alternates the home-visitor at bat lights 26–27, the contacts 59–4B reset any existing strikes when the third out is dialed, and contacts 59–4C reset any existing balls when the third out is dialed.

The sequence cam contacts 63–2A energize the feeds to the impulse stepper circuits and seqquence cam contacts 63–3A reset the impulse stepper 20 after the sequence cam contacts 63–2A close and open.

The light boxes 23, 24 and 25 are illustrated schematically and diagrammatically in FIGURE 9 and include a home team light box 23, an inning light box 24 and a visitor light box 25, each of which are of conventional construction and include the box figure 8 pattern of lamps, indicated by the reference character 85 in the tens digit column and a vertical column of lamps 85 at the tens digit position. The energization of the lamps 85 is controlled by the usual light box control unit including, for example, a stepper contact board 86 which may be similar in physical construction to the multiple switch employed in the impulser stepper, and which is controlled by the usual step-up coil 87 and reset coil 88 to selectively energize the lamps 85 or deenergize the same in accordance with known programs of connections. The electrical leads from the light boxes 23, 24 and 25 are brought out to five pin connectors 23A, 24A, and 25A which connect with the companion plugs 23B, 24B and 25B illustrated in FIGURE 8. From this the interconnections between the light boxes and the impulse stepper 20 and relay bank 21 can be readily traced.

It will be apparent from the above description that by the apparatus herein provided, the activation of the dial impulse device 15 in accordance with the code indicated by the dial position indicator card 34A illustrated in FIGURE 3 will effect remote control of the scoreboard 18 in the manner indicated by the card 34A and as hereinbefore described. For example, assuming the selector switch 38 to be in the blue position, manual operation of the dial of the impulsing device 15 to the number one or "ball" position will produce one pulse which will energize the blue dial relay 41. The closing of the normally open contacts 41A of the blue dial relay 41 completes the supply circuit to the stepper advance coil 50 which energizes this relay. Simultaneously, the closing of the blue dial relay contacts 41B operates the blue latch release relay coil 54, to set the contacts thereof at the blue condition, and the contacts 41C energize the stepper delay relay coil 47. The stepper advance coil 50 therefore advances the wiper arms 52A to 52H to the number one column of fixed contacts 52'. Upon passage of the delay period established by the delay incorporated in the stepper delay relay 47, the contacts 47A, which were opened by energization of the relay coil 47, reclose, completing the circuit to the sequence index coil 70 through the contacts 50B of the stepper advance coil 50. This draws down the index arm 71 associated with the sequence coil 70 to release the pin 72 from the peripheral notch in the sequence indexing disk 63-1 and also closes the index switch 70A to complete the 110 volt supply circuit to the cam motor 56. In this manner, the torque supplied from the motor 56 through the shaft 56A and the clutch 62 drives the sequence cams 63-2 and 63-3, to close the sequence cam contacts 63-2A and 63-3A in preselected phased relationship. The closing of the sequence cams contacts 63-2A completes a circuit from the 50 volt transformer secondary 45 through the blue-red latch relay contacts 54C to the blue feed contacts 52' of the impulse stepper 20 at positions one to eight in the path of the wiper arm 52D. The 50 volt supply from the transformer secondary 45 is thus applied from the impulse stepper wiper arm 52D to the wiper arm 52A, and thence to the ball index coil 67 through the impulse stepper contact 52' at the number one position in the path of the wiper arm 52A. The energization of the ball index coil 67 closes its associated switch 67A and draws down the associated index arm 71 to release the ball indexing disk 57-1 and permit the gang of cams 57-2, 57-3 and 57-4 to be rotated through one 90° interval before the ball unit 52 is latched again against movement by entry of the pin 72 on the index arm 71 into the next indexing notch on the disk 57-1. The first ball cam 57-2 is thus shifted to a position wherein its raised surface closes the associated ball cam contacts 57-2A and 57-2B. The closing of the contacts 57-2A completes the 110 volt energizing circuit to the ball one lamp of the lamps 28 on the scoreboard 18, thus effecting an indication on the scoreboard of the item indicated by the manipulation of the dial of the impulsing device 15.

It will be appreciated that the ball cams 57-2, 57-3 57-4 are designed so that the ball one lamp in the group of lamps 28 will operate on the first impulse of the ball index coil 67 and will remain on through other operations until the ball index disk 57-1 returns to a rest position. Thus, for example, the index disk 57-1 may have four notches spaced 90° apart and the ball cam 57-2 will have a minimum of 270° of raised surface to keep the first ball lamp activated for the desired interval. In a similar manner, the second ball cam 57-3 has a minimum of 180° of raised surface so as to close the second ball cam contacts 57-3A to energize the second ball lamp and maintain this lamp activated for the desired interval. The third ball cam 57-4 has a minimum of 90° of raised surface to energize the third ball lamp in the group of lamps 28 and retain this lamp in energized condition until the ball index disk 57-1 is returned to rest position. The ball four pin 57-5 is attached to the ball index disk 57-1 to operate its associated contacts 57-5A when the ball cam assembly 57 is in transit from the ball three position to the rest position. The pin 57-5 operates the contacts 57-5A which will energize the strike reset coil 76 if any strikes have been registered by the mechanical storage device 21. The second sequence cam 63-3 closes its associated contacts 63-3A a preselected time after the sequence cam contacts 63-2A are closed and opened to reset the impulse stepper 20, and therefore terminate the supply to the various relay coils which remain energized.

Similarly, the strike storage unit or cam assembly 58 includes the strike index disk 58-1 which has three peripheral notches or detents located at 120° intervals, the first strike cam 58-2 has a minimum of 240° of raised surface to keep the first strike light 29 activated for this interval of rotation of the strike cam assembly, the strike cam 58-3 has a minimum of 120° of raised surface to cause the second strike light to remain energized from the time of the second impulse of the strike index coil 68 until the strike index disk 58-1 returns to rest position and the third strike cam 58-4 which has a short duration raised surface to operate certain switches when the strike cam assembly is returning to a rest position from the strike two position.

The out cam assembly 59 may be identical in arrangement of the peripheral recesses on the out index disk 59-1 and in the contours of the out cams 59-2, 59-3, and 59-4 as the corresponding index disk and cams of the strike cam assembly 58.

It will be appreciated that variation of the number of peripheral recesses in the index disks and the circumferential extent of the raised surfaces on the cams may be altered, as for example by doubling the number of peripheral notches and halving the circumferential extent of the raised surfaces of the cams, to provide the desired storage periods.

The operation of the circuit in response to the impulses transmitted from the impulse device 15 for the other dial positions are similar to that previously described and can be readily traced from the circuit illustrated in the accompanying drawings and the preceding description. It should be noted, however, that the supply circuit to the hit lamp 31 from the contacts 79B includes the contacts 64A activated by the impulse cam 64 to produce a flashing light upon energization of the hit lamp and that the closing of the contacts 79C and 80C energizes the heater of the thermal delay tube 81 so as to automatically break the supply circuit to the hit or error relays 79, 80 when the thermal delay tube contacts 81 are open. When the add score signal indicated by position five on the dial indicator card 34A is dialed by the impulsing device 15, the impulse stepper wiper arms 52 are advanced to the number five position, the sequence cam contacts 62-2A are closed, and the 50 volt supply from the transformer secondary 45 is applied to the appropriate stepper contacts and wiper arms through the contacts 78B of the home-visitor alternator relay and thence through the plug 23B and socket 23A to the home light box 23 or through the plug 25B and socket 25A to the visitor light box 25 as determined by the setting of the home-visitor alternator relay 78. When the selector switch 38 is set at the red position, indicating reset functions, the impulses produced by the impulser wheel 34 energize the red dial relay 42 to shift the red-blue latch relay 53 to the red condition and apply the 50 volt supply from the transformer secondary 45 to the red feed contacts 52' of the impulse stepper 20 at the number one to number eight positions in the path of the wiper arm 52D and thereby establish supply circuits to energize the appropriate ones of the reset relays 75, 76 and 77.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Display apparatus for recording and displaying information on a sign comprising a sign having a plurality of groups of lamps wherein each group of lamps represents a different class of information, a plurality of switches for controlling the energization of said lamps, rotary storage means having a plurality of cams including a distinctive group of cams for each of said classes of information for activating said switches to energize the lamps of the associated group of lamps progressively as units of information of the associated class of information are signalled to the rotary storage means, said cams having means for retaining in energized state the previously energized lamps denoting earlier signalled units of information of the same class when subsequent units of information are signalled, remote control means for selectively producing different numbers of signal impulses, means responsive to the number of signal impulses produced by said remote control means for differentially activating said rotary storage means to activate said switches associated with said cams, said remote control means including selector switch means for conditioning said remote control means to produce signal impulses of either of two selected polarities, polarity sensitive means responsive to the polarities of the signal impulses produced by said remote control means to indicate the polarities thereof, reset means responsive to said polarity sensitive means for resetting said cams to a condition terminating energization of said signal lamps when signal impulses of selected polarities are received, each of said cam groups being activated by a distinctive number of signal impulses of one polarity, and said reset means being operative to reset each cam group upon receipt of the same number of signal impulses of the opposite polarity.

2. In display apparatus, the combination recited in claim 1 wherein said means for differentially activating said rotary storage means includes impulse stepper means responsive to the number of signal impulses applied thereto to position said cams to establish a distinctive set of circuit connections for each number of signal impulses, means responsive to a portion of some of said sets of circuit connections for activating different selected groups of said cams to actuate their associated switches, and said polarity sensitive means being responsive to the polarities of signal impulses applied thereto for applying different voltages to different portions of said sets of circuit connections in accordance with the polarities of the signal impulses.

3. In display apparatus, the combination recited in claim 2, wherein said remote control means includes a manually rotatable dial having a plurality of different dial positions for distinctive display functions, and impulse generating switch means for generating a different number of signal impulses for each dial position.

4. Baseball scoreboard apparatus for recording and displaying the progress of play of the game of baseball comprising a scoreboard having distinctive groups of plural signal lamps for signalling balls, strikes and outs in accordance with the number of lamps energized, a plurality of switches individually associated with each of said ball, strike and out signal lamps for controlling energization of the lamps, a rotary mechanical storage unit including a motor driven shaft having journalled thereon separate cam groups each of a plurality of cams for activating the switches to energize the lamps associated with the ball, strike and out lamps progressively as signal impulses denoting balls, strikes and outs are signalled to said storage unit, one of said cams being provided for each of said separate switches, restraining means normally holding said cams of each group against rotation with said shaft, release means for each of said cam groups to release the associated cams to rotate through selected angular increments in unison with the shaft means for driving said cam groups from said shaft when the cam groups are released by said release means, said cams having means for retaining in energized state the previously energized lamps denoting earlier signalled units of information of the same class when subsequent units of information are signalled, remote control means for selectively producing different numbers of signal impulses denoting balls, strikes and outs, said remote control means including selector switch means for conditioning said remote control means to produce signal impulses of either of two selected polarities, impulse stepper means responsive to the number of signal impulses produced by said remote control means for differentially activating said release means to cause said shaft to rotate selected ones of said cam groups through selected angular increments and activate said switches to energize said signal lamps, polarity sensitive means responsive to the polarities of the signal impulses produced by said remote control means to indicate the polarities thereof, reset means responsive to said polarity sensitive means for resetting said cams to a condition terminating energization of said signal lamps when signal impulses of selected polarities are received, each of said cam groups being activated by a distinctive number of signal impulses of one polarity, and said reset means being operative to reset each cam group upon receipt of the same number of signal impulses of the opposite polarity.

5. In baseball scoreboard apparatus for recording and displaying the progress of play of the game of baseball, the combination recited in claim 4, wherein said scoreboard includes additional signal lamps for signalling hits and errors, and number-forming light panels for forming numbers by energizing certain portions of the light panels, switches individually associated with each of said hit and error signal lamps for energizing the same, said rotary mechanical storage unit including a separate cam on said shaft for each of the switches associated with said hit and error lamps, and relay means interconnected with said impulse stepper means for energizing said hit and error lamps responsive to receipt of selected numbers of signal impulses by said impulse stepper means, said shaft having an impulser cam thereon and switch means activated thereby and interconnected between said last-mentioned relay means and said hit and error lamps to intermittently make and break the energizing circuit to said hit and error lamps.

6. In baseball scoreboard apparatus for recording and displaying the progress of play of the game of baseball, the combination recited in claim 4, wherein said remote control means comprises telephone dial means having a plurality of dial positions, one of said dial positions signifying advancement of the score, means for producing a different number of signal impulses for each dial position, and said selector switch means including means for causing the signal impulses produced for each dial position to have either of two opposite polarities; said scoreboard having a pair of number-forming light panels for displaying the visiting team score and the home team score each having a plurality of lamps for forming numbers by energizing certain combinations of said lamps, switch means individually associated with each of said light panels, said impulse stepper means including a plurality of wiper arms and means for advancing the same in a selected path to spaced positions responsive to different numbers of signal impulses produced by said dial means corresponding to said dial positions and a set of contacts for each of said dial positions located in the path of movement of said wiper arms at said spaced positions for establishing distinctive electrical circuits for each of said spaced positions, one of said sets of contacts corresponding to said dial position signifying advancement of the score having first and second groups of contacts forming the set of contacts, means connecting said first group of contacts to the switch means for the home team light panel and means connecting said second group of contacts to the switch means for the visiting team light panel, and said polarity sensitive means including means responsive to the polarity of the signal impulses produced by said dial means for connecting supply voltages to either of said first group of contacts or said second group of contacts to energize the switch means connected thereto.

7. In baseball scoreboard apparatus, the combination recited in claim 4 wherein said mechanical storage unit includes an index disk for each of said cam groups rigidly interconnected with the associated cams against relative movement, releasable index means normally restraining said index disks and their associated cams against rotary movement with said shaft, means for driving each group of cams and index disks from said shaft when said index disks are released, contact means connected with said index means to selectively cause said index means to release said index disks and cams, said cams having raised peripheries over selected portions thereof to maintain certain lamps of said groups of lamps which have been energized in an energized state when other lamps of said groups of lamps become energized, and said reset means including means for causing said index means to release said index disks and their associated cams to be driven by said shaft to a selected starting position.

References Cited in the file of this patent

UNITED STATES PATENTS

| | | |
|---|---|---|
| Re. 13,707 | Long | Mar. 31, 1914 |
| 988,829 | Smiley | Apr. 4, 1911 |
| 1,167,423 | Nelson | Jan. 11, 1916 |
| 1,769,060 | Hendry | July 1, 1930 |
| 1,967,331 | Smith | July 24, 1934 |
| 2,034,744 | Campagna et al. | Mar. 24, 1936 |
| 2,238,756 | Steeneck | Apr. 15, 1941 |
| 2,917,773 | Justus | Dec. 15, 1959 |